United States Patent [19]
Sakaida et al.

[11] Patent Number: 5,350,962
[45] Date of Patent: Sep. 27, 1994

[54] DRIVING DEVICE FOR PIEZOELECTRIC ELEMENT

[75] Inventors: Atsuo Sakaida, Gifu; Yoshihumi Suzuki, Ena; Yoshiyuki Ikezaki, Nagoya; Akira Iriguchi, Nagoya; Masashi Suzuki, Nagoya, all of Japan

[73] Assignee: Brother Kogyo Kabushiki Kaisha, Aichi, Japan

[21] Appl. No.: 41,300

[22] Filed: Mar. 30, 1993

Related U.S. Application Data

[63] Continuation of Ser. No. 728,592, Jul. 11, 1991, abandoned.

[30] Foreign Application Priority Data

Jul. 11, 1990 [JP] Japan ................................. 2-186260
Jul. 11, 1990 [JP] Japan ................................. 2-186261

[51] Int. Cl.⁵ .......................... H01L 41/09; B41J 2/30
[52] U.S. Cl. .................................................... 310/316
[58] Field of Search ................. 310/316, 317; 318/116

[56] References Cited

U.S. PATENT DOCUMENTS

| | | | |
|---|---|---|---|
| 4,529,322 | 7/1985 | Ueda | 318/116 |
| 4,595,854 | 6/1986 | Yano et al. | 310/317 |
| 4,767,959 | 8/1988 | Sakakibara et al. | 310/317 |
| 4,947,074 | 8/1990 | Suzuki | 310/316 |
| 5,036,263 | 7/1991 | Yamada et al. | 318/116 |
| 5,095,256 | 3/1992 | Ueyama et al. | 318/116 |
| 5,214,340 | 5/1993 | Suzuki | 310/316 |

FOREIGN PATENT DOCUMENTS

| | | | |
|---|---|---|---|
| 59-198885 | 10/1984 | Japan | H02N 11/00 |
| 63-130357 | 2/1988 | Japan | B41J 3/10 |
| 2301170 | 12/1990 | Japan | 310/317 |
| 2198604 | 6/1988 | United Kingdom | H03K 17/00 |

Primary Examiner—Thomas M. Dougherty
Attorney, Agent, or Firm—Kane, Dalsimer, Sullivan, Kurucz, Levy, Eisele and Richard

[57] ABSTRACT

A driving device for a piezoelectric element is provided which attains lower power consumption, low heat generation and low cost. To displace a piezoelectric element, a first switching transistor is rendered ON by a control circuit. The electric charges flow in the piezoelectric element from the power supply through the first switching transistor. This state is continued until a sufficient amount of electric charges are stored in the piezoelectric element. To restore the piezoelectric element thus displaced, a second switching transistor is rendered ON under the condition where the first switching transistor is OFF. In this condition, a resonance circuit is formed by the piezoelectric element and the coil. When the electric charges are flowing in the coil and a predetermined period of time has elapsed after the second switching transistor is rendered ON, the control circuit renders the second switching transistor OFF, whereby the current flowing in the coil flows into the power supply.

14 Claims, 7 Drawing Sheets

DRIVING DEVICE FOR PIEZOELECTRIC ELEMENT

This application is a continuation, of application Ser. No. 07/728,592, filed Jul. 11, 1991, now abandoned.

BACKGROUND OF THE INVENTION

The present invention relates to a driving device for a piezoelectric element, and more particularly to such a driving device capable of attaining lower power consumption, low heat generation, and low cost.

A combination of a piezoelectric element and a coil resonate at a given frequency while repeating charging and discharging. When the piezoelectric element is used for driving a print wire of a printer, it is required that a displaced condition of the piezoelectric element be maintained for a predetermined period of time. Japanese Laid Open Patent Publication No. 63-130357 discloses a driving device to this effect.

The driving device disclosed therein is arranged as shown in FIG. 1. A piezoelectric element 102 is connected through the emitter-collector path of a switching transistor 103 to the power supply terminal of a power supply 101. The switching transistor 103 serves to apply the power supply voltage to the piezoelectric element 102 in response to a driving signal V2. A diode 110 is connected in parallel across the piezoelectric element 102 so that a voltage is applied to the diode 110 in reverse direction when the switching transistor 103 is ON. Further, the non-grounded terminal of the piezoelectric element 102 is connected to one terminal of a coil 105 and another terminal of the coil 105 is in turn connected through a diode 109 to the power supply terminal of the power supply 101. The diode 109 is connected to flow a current only in a direction from the piezoelectric element 102 to the power supply terminal.

A connection between the diode 109 and the coil 105 is connected to the collector of the switching transistor 106. The switching transistor has an emitter connected to ground and a base connected to the collector of a switching transistor 108. The switching transistor 108 has an emitter connected through a resistor to the non-grounded terminal of the piezoelectric element 102, and a base connected to the collector of a switching transistor 107. The switching transistor 107 has an emitter connected to ground and a base applied with a release signal V3.

In the circuit configured as above, when the drive signal V2 is high, the switching transistor 103 is rendered conductive. Then, electric charges supplied from the power supply terminal are charged in the piezoelectric element 102 through the switching transistor 103, thereby resulting in a displacement of the piezoelectric element 102.

To restore the piezoelectric element 102, the drive signal V2 is rendered low and the release signal V3 is rendered high. Then, further supply of the electric charges to the piezoelectric element 102 is interrupted and the switching transistor 107 is rendered conductive. The base voltage of the switching transistor 108 is therefore at 0 volt. However, the emitter of the switching transistor 108 is applied with a voltage because it is connected to the piezoelectric element which has been electrically charged. Due to a voltage developed across the base and emitter of the switching transistor 108, the switching transistor 108 is rendered conductive. The base of the switching transistor 106 is therefore applied with a voltage approximately equal to the terminal voltage of the piezoelectric element 102, thereby causing to render the switching transistor 106 conductive. A series connection of the piezoelectric element 102 (which is equivalent to a capacitor) and the coil 105 forms a resonant circuit. The current flowing in the coil 105 and the voltage thereacross are in the form of a sinuasoidal waveform whose frequency is determined by the inductance of the coil 105 and the capacitance of the piezoeletric element 102. A phase difference between the current and the voltage is 90 degrees if pure resistor components included in the circuit are neglected. Further, there is no loss in the circuit due to the fact that no substantial pure resistor components are included in the circuit. If a time corresponding to a quarter of one period has been expired after the release signal is raised high, the voltage applied to the coil is zeroed as the voltage applied thereto changes in the sinusoidal waveform. At this moment, since the emitter of the switching transistor 108 is at 0 volt, the switching transistor 108 is rendered OFF and concurrently the switching transistor 106 is also rendered OFF. As a result, the current flowing in the coil 105 is entirely flowed into the power supply 101 through the diode 109. As such, the electric charges discharged from the piezoelectric element 102 are not thermally wasted, and the low heat generation and low power supply consumption are attained.

A load of relatively large mass is generally connected to such piezoelectric element. The piezoelectric element is typically urged by a resilient member such as a leaf spring in a direction to restore the displacement. Further, since the piezoelectric element is weak against a tensile force, there has been proposed a structure in which a movable member is mechanically disconnected from the piezoelectric element when the piezoelectric element is made free from the excitation. When the piezoelectric element is made free from the excitation, the movable member moves back by the aid of the leaf spring with a small delay from the time when the piezoelectric element is restored. At this time, the movable element impinges upon the piezoelectric element, whereby electric charges are produced in the electrode of the piezoelectric element.

However, with the use of the driving device as constructed above, the piezoelectric element 102 is electrically isolated because the switching transistor 106 is OFF, and thus the electric charges are held in the piezoelectric element 102. Accordingly, a small amount of displacement occurs in the piezoelectric element due to the electric charges held therein. If the piezoelectric element is used as the print wire driving mechanism of a printer, the print wire is held in a slightly projected state. This causes to bother the feeding of an ink ribbon.

Further, the conventional driving device as shown in FIG. 1 is complicated in configuration and the provision of the device at low cost is difficult as many switching transistors are used therein. Further, a loss results from the use of many switching transistors and therefore the conventional driving device is not satisfactory in terms of low power consumption.

SUMMARY OF THE INVENTION

The present invention has been made to solve the aforementioned problems, and it is an object of the invention to achieve low power consumption and low heat generation by effectively feeding the electric charges stored in the piezoelectric element back to the power supply.

It is another object of the invention to prevent undesirable displacement of the piezoelectric element by effectively releasing the residual electric charges remaining in the piezoelectric element at the time of non-excitation of the piezoelectric element.

In order to achieve the above object, the present invention provides, according to one aspect of the present invention, a driving device for driving a piezoelectric element having first and second terminals, which comprises power supplying means, a coil having a first terminal electrically connected to the first terminal of the piezoelectric element, and a second terminal electrically connected to the power supplying means; switching means selectively rendered ON and OFF, the switching means electrically connecting the second terminal of the coil to the second terminal of the piezoelectric element, thereby forming a resonance circuit with the piezoelectric element and the coil when the switching means is ON, and control means for controlling the switching means, wherein the switching means is rendered ON when the piezoelectric element is instructed to restore from a displaced condition, the switching means is rendered OFF after expiration of a predetermined period of time from a time when the switching means is rendered ON, and the switching means is again rendered ON after electrical energy retained in the coil is fed back to the power supplying means. The switching means comprises first switching means and second switching means.

In operation, to displace the piezoelectric element, the first switching means is rendered ON by the control means. Then, the electric charges flow into the piezoelectric element from the power supplying means through the first switching means, thereby displacing the piezoelectric element. The ON state of the first switching means continues until a sufficient amount of electric charges are stored in the piezoelectric element. To restore the piezoelectric element from the displaced condition, the first switching means is rendered OFF by the control means, and under this condition the second switching means is rendered ON by the control means. In this condition, the resonant circuit is formed by the piezoelectric element and the coil. The electric charges stored in the piezoelectric element flow out from the coil and are again stored in the piezoelectric element. This action is repeatedly carried out. The control means waits for a timing at which the electric charges flow in the coil, and when the predetermined period of time has expired from the time when the second switching means is rendered ON, the second switching means is rendered OFF by the control.-means, whereby the current flowing in the coil returns to the power supplying means.

In accordance with another aspect of the present invention, there is provided a driving device for driving a piezoelectric element having first and second terminals, which comprises power supplying means, a coil having a first, terminal electrically connected to the first terminal of the piezoelectric element, and a second terminal electrically connected to the power supplying means, switching means selectively rendered ON and OFF, the switching means electrically connecting the second terminal of the coil to the second terminal of the piezoelectric element, thereby forming a resonance circuit with the piezoelectric element and the coil when the switching means is ON, time measuring means for measuring a predetermined period of time, and control means for controlling the switching means, wherein the switching means is rendered ON when the piezoelectric element is instructed to restore from a displaced condition, and the switching means is rendered OFF when expiration of the predetermined period of time is instructed by the time measuring means.

In operation, to restore the piezoelectric element from the displaced condition, the switching means is rendered ON. In this condition, the piezoelectric element and the coil form the resonance circuit, wherein the electrical charges stored in the piezoelectric element are flowed out therefrom through the coil. The switching means is not rendered OFF until the expiration of the predetermined period of time is indicated by the time measuring means. Up to the time when the switching means is rendered OFF, the electrostatic energy given by the electric charges are substantially converted to energy in the form of an electrical current. The current flowing in the coil can thus flow into the power supplying means.

The above and other objects, features and advantages of the present invention will become more apparent from the following description when taken in conjunction with the accompanying drawings in which preferred embodiments of the present invention are shown by way of illustrative examples.

DETAILED DESCRIPTION OF THE PREFERRED EMBODIMENTS

An embodiment of the present invention will now be described in detail with reference to the accompanying drawings. In the illustrated embodiment, the driving device of a piezoelectric element is used as a piezoelectric actuator for driving a print wire of an impact dot printer print head.

Figure 2:
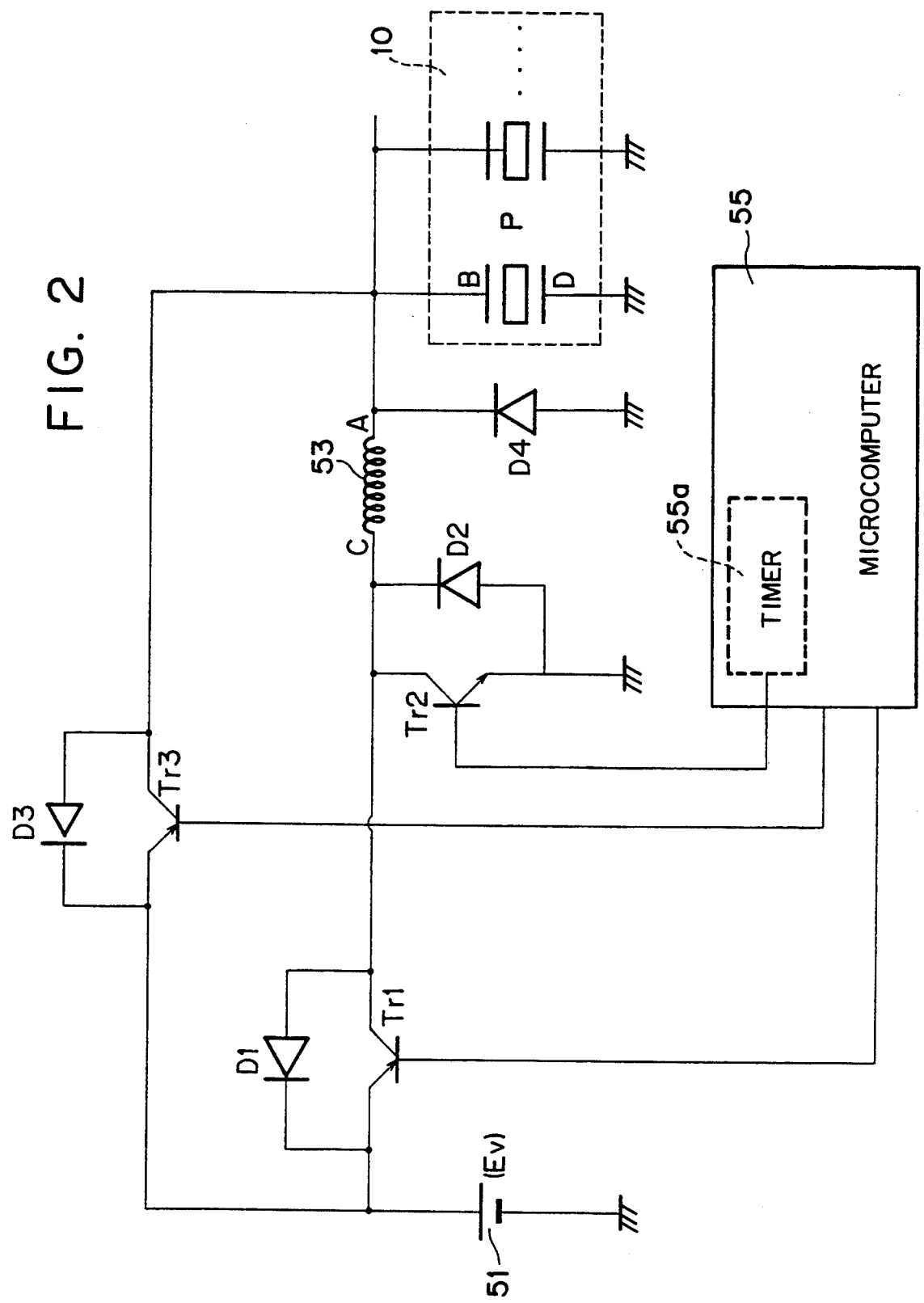
FIG.2 is a circuit diagram showing an piezoelectric element driving device according to an embodiment of the present invention.
Figure 3:
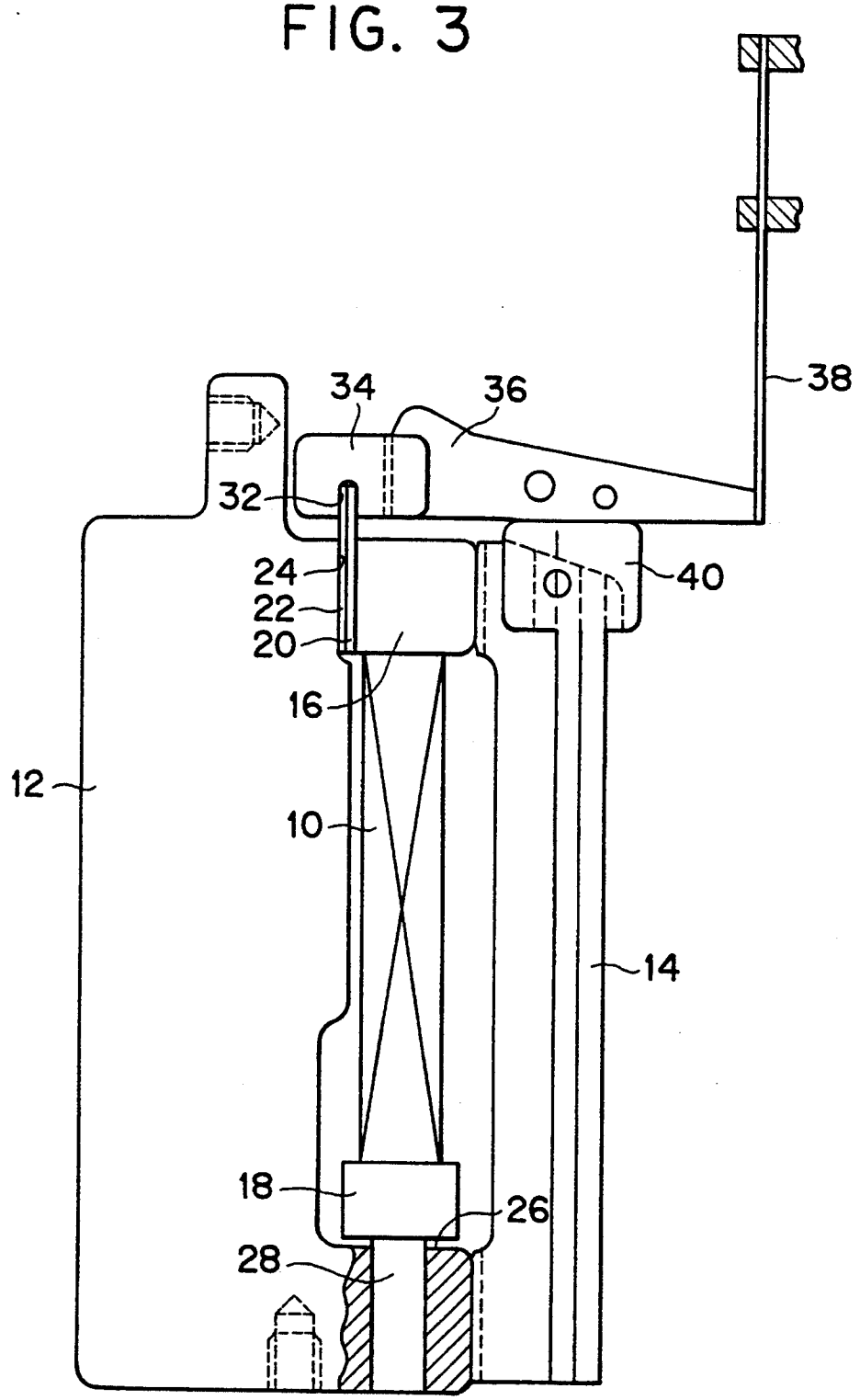
FIG. 3 is a front view showing a print element assembly of an impact dot printer driven by the driving device according to the embodiment of the present invention.

A piezoelectric actuator includes a layer-built piezoelectric element 10 having a plurality of piezoelectric elements P arranged along a line as shown in FIG. 2. The piezoelectric element 10 is supported by two frames 12, 14 extending in a direction parallel to the longitudinal direction of the piezoelectric element 10.

The piezoelectric element 10 has two end faces to which a movable element 16 and a temperature compensation block 18 are fixedly secured, respectively, both of which are of rectangular parallelepiped shape. One side face of the movable element 16 faces a surface 24 of the frame 12 through a pair of leaf springs 20, 22 superposed one on the other. The rear face of the temperature compensation block 18 faces a surface 26 of the frame 12. The movable element 16 and the leaf spring 20 are fixedly secured to each other and the leaf spring 22 and the frame 12 are also fixedly secured to each other. The leaf springs 20 and 22 are in surface contact with each other to be slidably movable. A pin 28 is fixedly provided in the frame 12. The pin 28 is in contact with the temperature compensation block 18 and urges the temperature compensation block 18 toward the movable element 16. The piezoelectric element 10 is secured to the frames 12, 14 while being imparted with a small compression force in the longitudinal direction. Therefore, if a voltage is applied to the piezoelectric element 10 and the latter extends in its longitudinal direction, the leaf spring 20 moves in a positive direction (upward in the figure) relative to the leaf spring 22. On the other hand, if the application of the voltage to the piezoelectric element 10 is ceased to restore the piezoelectric element 10, the leaf spring 20 moves in the opposite direction.

Even if the voltage which has been applied to the piezoelectric element 10 is completely zeroed, there remains a positive directional residual distortion in the piezoelectric element 10. The higher is the temperature of the piezoelectric element 10, the smaller is this residual distortion. Therefore, as far as the temperature is high, even if both the voltage applied to the piezoelectric element 10 and an amount of displacement of the piezoelectric element 10 are controlled to be constant, the maximum displacement position of the piezoelectric element 10 does not reach the correct position. The higher the temperature is, the more does a distance between the correct position and the maximum displacement position increase. To eliminate the shortage of the displacement position, the temperature compensation block 18 is provided. The temperature compensation block 18 expands a greater extent as the temperature becomes higher. The temperature compensation block 18 is disposed in the displacement direction of the piezoelectric element 10. Specifically, the temperature compensation block 18 is provided to compensate the shortage of displacement of the piezoelectric 10 with the expansion length of the temperature compensation block 18 so that the maximum displacement position of the piezoelectric element 10 does not vary depending upon the temperature change.

The frame 14 is made of a deformable resilient material having a longitudinal dimension longer than that of the piezoelectric element 10. The frame 14 connects an end portion of the frame 12 with the movable member 16. The function imposed on the frame 14 will be described later.

The upper ends of the leaf springs 20, 22 are received in a groove 32 formed in a retaining member 34. The width of the groove 32 is larger than the sum of the thickness of the leaf springs 20, 22. The leaf springs 20, 22 are fixedly secured to the side walls of the groove 32. An arm 36 extends from the retaining member 34, to the tip end of which a print wire 38 is fixedly attached. The print wire 38 is disposed in confrontation with the print paper through an ink ribbon.

When the leaf spring 20 slidably moves upwardly relative to the leaf spring 22 attendant to the extension of the piezoelectric element 10, the retaining member 34 is rotated counter-clockwise about its center. The print wire 38 is impinged against the print paper through the ink ribbon, thereby making a dot impression on the print paper. When the piezoelectric element 10 is retracted from this state, the retaining member 34 is rotated clockwise, with the result that the print wire 38 returns to a non-operable position. The non-operable position of the print wire 38 is defined by a position where the arm 36 is brought into abutment with a stopper 40 made of a low repellent rubber.

As is apparent from the foregoing description, the piezoelectric actuator augmentedly transmits the displacement of the piezoelectric element 10 to the print wire via the leaf springs 20, 22, the retaining member 34 and the arm 36.

When the print wire 38 is impinged against the print paper, a moment causing to rotate the movable member 16 in counterclockwise direction about its center is imparted to the movable member 16, so that the piezoelectric element 10 is liable to be bend. In this embodiment, however, the frame 14 is resiliently prolonged in accordance with the prolongation of the piezoelectric element 10 and therefore another moment is imparted to the movable member 16 causing to rotate it in the clockwise direction. As a result, the opposite directional two moments are canceled out each other and hence the piezoelectric element 10 is riot bent but is allowed to linearly prolong or retract.

A driving circuit of the piezoelectric element 10 is shown in FIG. 2. In this embodiment, a D.C. power supply 51 generating an output voltage E, a transistor Tr1, a coil 53 and a piezoelectric element P are sequentially connected in series. The negative electrodes of both the D.C. power supply 51 and the piezoelectric elements P are connected to ground. The forward direction of the transistor Tr1 is a direction toward the positive electrode of the piezoelectric element P from the positive electrode of the D.C. power supply 51 (hereinafter this direction will be referred to as "forward direction of the circuit").

The connection between the transistor Tr1 and the coil 53 is grounded through a transistor Tr2. The forward direction of the transistor Tr2 is a direction toward ground from the connection between the transistor Tr1 and the coil 53. Diodes D1 and D2 are connected in parallel to the transistor Tr1 and Tr2, respectively. The forward direction of each of the diodes D1, D2 is reverse to the forward direction of the associated transistor. The positive electrodes of both the D.C. power supply 51 and the piezoelectric elements P are connected to each other via a diode D3. The forward direction of the diode D3 is reverse to the forward direction of the circuit. A transistor Tr3 is connected in reverse direction relative to the diode D3. A diode D4 is connected in parallel to the piezoelectric elements P. The forward direction of the diode D4 is a direction toward the positive electrode of the piezoelectric element P from the negative electrode thereof. A plurality of piezoelectric elements P constituting the layer-built piezoelectric element 10 are connected in parallel to one another.

Switching between ON and OFF of each of the transistors Tr1, Tr2 and Tr3 is effected by a transistor control circuit (hereinafter referred simply to as "control circuit 55"). The control circuit 55 also governs the entire operations of the impact printer and is comprised of a microcomputer. The control circuit 55 incorporates a timer 55 a in the interior thereof.

Figure 4A:
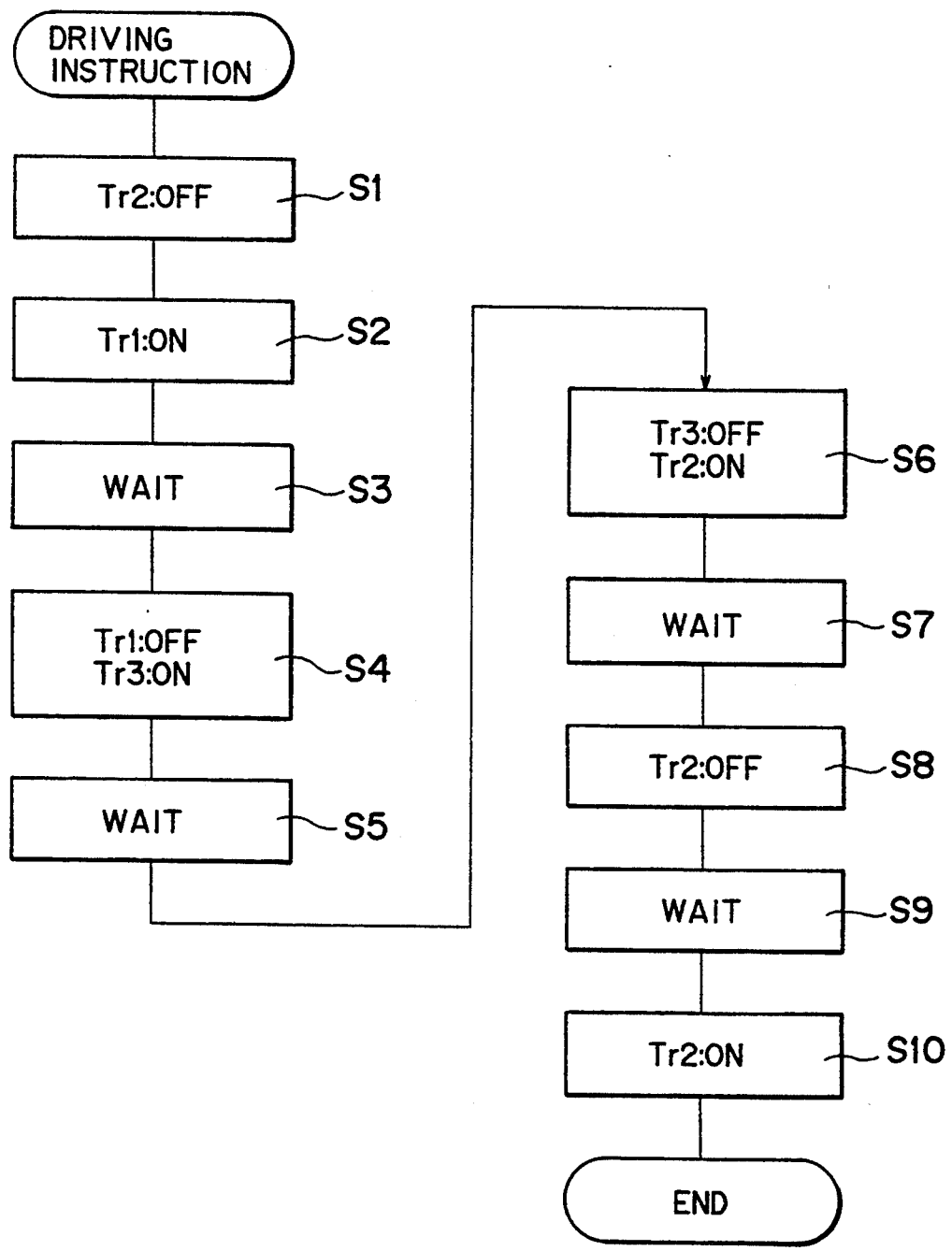
FIGS. 4A and 4B are flow charts for description of processes performed by a control circuit.
Figure 4B:
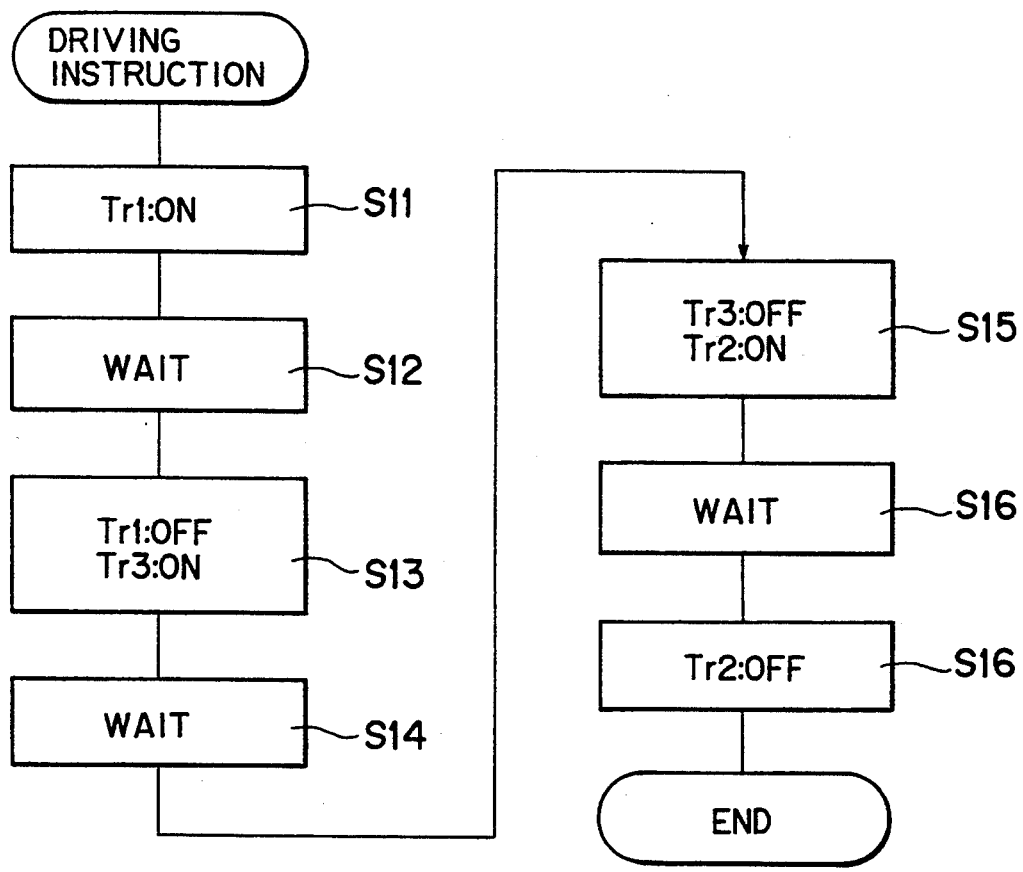

Operations performed by the control circuit 55 will next be described. FIG. 4A is a flow chart for controlling the operation of a particular print element with which a dot is printed. The control circuit performs not only the control indicated in the flow chart of FIG. 4A but also the control of the operations of the remaining print elements and the printer control.

When a driving of a print element is instructed, the transistor Tr2 is rendered non-conductive (step S1) by the control circuit 55, and immediately thereafter the transistor Tr1 is rendered conductive (step S2). The electric charges produced in the D.C. power supply 51 flow into the piezoelectric elements P via the transistor Tr1 and the coil 53, resulting in the displacement of the piezoelectric elements P. The print wire 38 projects and makes a dot impression on the print paper supported on the platen in accordance with the displacement of the piezoelectric elements P.

The control circuit 51 waits until a sufficient amount of electric charges are stored in the piezoelectric elements P (step S3). A current continuously flows in a closed loop including the diode D3 and the transistor Tr1 due to the operation of the coil 53, thereby retaining the current flowing in the coil 53.

After the sufficient amount of charges are stored in the piezoelectric elements P, the transistor Tr1 is rendered non-conductive and the transistor Tr3 is rendered conductive by the control circuit 51 (step S4). Due to the operation of the coil 53, a current continuously flows in the coil 53. This current flows in a closed loop including the diode D3, the D.C. power supply 51 and the diode D2 but is gradually attenuated. Up to this time, while a small amount of current is wasted in the piezoelectric elements P, a current is supplied to the piezoelectric elements P from the D.C. power supply 51 via the transistor Tr3. Thus, the displaced condition of the piezoelectric elements P is held unchanged.

The control circuit 55 is placed in a waiting condition for a duration that the current flowing in the coil 53 is attenuated and for a time required for printing (step S5). Thereafter, the transistor Tr3 is rendered non-conductive and the transistor Tr2 is rendered conductive after a delay of a brief period of time (step S6). The electric charges stored in the piezoelectric elements P flow in a closed loop including the coil 53 and the transistor Tr2. Since a pure resistor element is not included in the closed loop, no substantial thermal consumption of the electrical energy takes place. The electrical energy corresponding to the electric charges stored in the piezoelectric elements P is entirely stored in the coil in the form of a magnetic energy distributed in the vicinity of the coil 53 after a prescribed period of time to be described later.

The control circuit 55 is placed in a waiting condition up to this instant (step S7), and renders the transistor Tr2 non-conductive (step S8). Then, by the operation of the coil 53, the current flowing in the coil 53 is to be maintained, so that the current is returned to the D.C. power supply 51 via the diode D1. Specifically, all the electrical energy stored in the coil L is fed back to the D.C. power supply 51.

As described, the control circuit 55 waits until the electrical charges stored in the piezoelectric elements P are fed back to the D.C. power supply 51 (step S9) and again renders the transistor Tr2 conductive (step S10) for the reasons stated below.

The piezoelectric elements P are prolonged by the process executed in step S6. On the other hand, the print wire returns to the retracted position from the projected position due to the rebound of the print wire on the platen and the resiliency of the leaf springs. For this reason, a compressive force is imparted upon the piezoelectric elements P after a delay of a brief period of time from the process in step S6. The piezoelectric elements P are slightly displaced and thus electric charges are produced in their electrodes. Vibrations of the print wire 38 are transmitted to the piezoelectric elements P and a force resulting from the vibrations is also imparted to the piezoelectric elements P. For such reasons, the electric charges are produced in the piezoelectric elements P. If these charges are not released, they are stored in the piezoelectric elements P, causing to displace the piezoelectric elements P and to place the print wire in a slightly projected position from the print head surface. After expiration of a period of time sufficient to feed back the electric charges stored in the piezoelectric elements P to the D.C. power supply 51, the transistor Tr2 is again rendered conductive by the control circuit 44 in step S10. The transistor Tr2 is maintained at conductive state until the same print wire is nextly driven (step S1).

Waiting times in steps S7 and S9 will next be described. When the transistor Tr2 is rendered conductive at time $t=0$, there is formed a closed circuit made up of the piezoelectric elements P (equivalent to capacitor C), the coil 53 and the transistor Tr2. Due to electrostatic energy stored in the piezoelectric elements P, a current flows from the piezoelectric elements P to the coil 53. Assuming that the time at which the transistor is rendered conductive is $t=0$ and that the current flowing into the piezoelectric elements P from the transistor Tr2 is i(t), the following equation is obtained according to Kirchhoff's second law applied to the above-mentioned closed circuit, where it is assumed that no resistor components are contained in the transistor Tr2 and other elements.

$$L \frac{d}{dt} i(t) + \frac{1}{c} \int i(t) dt = 0 \qquad (1)$$

where L represents an inductance of the coil 53, and C an electrostatic capacitance of the piezoelectric elements P.

Representing the electric charges in the piezoelectric elements P with q(t), q(t) is given as follows.

$$q(t) = \int i(t) dt \qquad (2)$$

$$i(t) = \frac{d}{dt} q(t) \qquad (3)$$

By substituting equations (2) and (3) for equation (1), the following equation is obtained.

$$L \frac{d^2}{dt^2} q(t) + \frac{1}{c} q(t) = 0 \qquad (4)$$

By solving the above differential equation, q(t) will be obtained. To this end, a differential operator p is introduced. The differential operator p is expressed by the following equation.

$$p = \frac{d}{dt} \qquad (5)$$

By substituting equation (5) for equation (4), the following equation is obtained.

$$Lp^2 + \frac{1}{c} = 0 \qquad (6)$$

By solving equation (6), the following results.

$$p = \pm j \frac{1}{\sqrt{LC}} \quad (7)$$

where j is imaginary unit. Here, by introducing constant $A_1$ and $A_2$, q(t) can be written by the following equation.

$$q(t) = A_1 \exp\left(j\frac{1}{\sqrt{LC}} t\right) + A_2 \exp\left(-j\frac{1}{\sqrt{LC}} t\right) = \quad (8)$$

$$(A_1 + A_2)\cos\left(\frac{1}{\sqrt{LC}} t\right) + j(A_1 - A_2)\sin\left(\frac{1}{\sqrt{LC}} t\right)$$

Now the following definitions are made.

$$A = A_1 + A_2 \quad (9)$$

$$B = j(A_1 - A_2) \quad (10)$$

$$\omega_0 = \frac{1}{\sqrt{LC}} \quad (11)$$

Equation (8) can be written as follows using equations (9), (10) and (11).

$$q(t) = A \cos \omega_0 t + B \sin \omega_0 t \quad (12)$$

By substituting equation (12) for equation (3), the following equation is obtained.

$$i(t) = 107_0 [B \cos \omega_0 t - A \sin \omega_0 t] \quad (13)$$

Next, let us consider an initial condition at time t=0. Before the time t=0, electric charges are stored in the piezoelectric elements P for carrying out printing. At this time, a voltage across the piezoelectric elements P is equal to the power supply voltage E. Since the electrostatic capacity of the piezoelectric elements P is C, the charges stored in the piezoelectric elements P at time t=0 are represented by the following equation.

$$q(t)|_{t=0} = CE \quad (14)$$

Since the transistor Tr2 is not rendered conductive until time t=0, no current flows in the coil 53 at time t=0. Therefore, the current flowing in the coil 53 at time t=0 is expressed by the following equation.

$$i(t)|_{t=0} = 0 \quad (15)$$

Substituting equations (14) and (15) and t=0 for equations (12) and (13), the constants A and B are given as follows.

$$A = CE \quad (16)$$

$$B = 0 \quad (17)$$

Substituting equations (16) and (17) for equations (12) and (13), the following equation is obtained.

$$q(t) = CE \cos \omega_0 t \quad (18)$$

$$i(t) = -\omega_0 CE \sin \omega_0 t \quad (19)$$

On the other hand, representing the voltage across the piezoelectric elements P with v(t), v(t) can be expressed as follows.

$$v(t) = \frac{1}{C} q(t) \quad (20)$$

Substituting equation (18) for equation (20), the following equation is obtained.

$$v(t) = E \cos \omega_0 t \quad (21)$$

Therefore, when the transistor Tr2 is rendered conductive at time t=0, the voltage v(t) across the piezoelectric elements P is given by equation (21) until it is zeroed. On the other hand, the time at which the voltage v(t) across the piezoelectric element P is zeroed is given by solving equation (21) whose left side is equal to zero.

$$E \cos \omega_0 t = 0 \quad (22)$$

$$\omega_0 t = \pm \frac{\pi}{2}, \pm \frac{3}{2}\pi, \pm \frac{5}{2}\pi \ldots \quad (23)$$

$$t = \pm \frac{1}{2} \cdot \frac{\pi}{\omega_0}, \pm \frac{3}{2} \cdot \frac{\pi}{\omega_0}, \ldots \quad (24)$$

It can be appreciated from equation (24) that the time at which the voltage v(t) across the piezoelectric elements P is firstly zeroed from the time t=0 is $$t = \frac{1}{2} \cdot \frac{\pi}{\omega_0}.$$

The value of $\omega_0$ is defined in equation (11). By substituting this value, a time $$t = \frac{\pi}{2} \sqrt{LC}$$

is obtained. If the transistor Tr2 is rendered non-conductive at the time $$t = \frac{\pi}{2} \sqrt{LC},$$

the current i(t) resulting from the electric energy in the coil 53 is incapable of flowing in the transistor Tr2, so that the current flows in the closed circuit including the coil 53, the diode D1, the D.C. power supply 51 and the diode D4. It is now defined so that time $t_1$ is the time at which the transistor Tr2 is rendered non-conductive That is the following definition is made.

$$t_1 = \frac{\pi}{2} \sqrt{LC} \quad (25)$$

On the other hand, according to Kirchhoff's second law, the following equation is established with respect to the closed circuit mentioned above.

$$E = -L \frac{d}{dt} i(t) \quad (26)$$

By solving equation (26), the following equation is obtained.

$$i(t) = -\frac{E}{L}t + K \qquad (27)$$

With respect to the initial condition of equation (27), $t_1$ of equation (25) may be substituted for t of equation (19). Accordingly, the value $i(t_1)$ representative of the value of i(t) at time $t_1$ is as follows.

$$i(t_1) = i(t)\,|_{t=t_1} = \omega_0 CE \qquad (28)$$

Eliminating constant K of equation (27) with the use of equation (28), i(t) after $t=t_1$ is as follows.

$$i(t) = -\frac{E}{L}(t - t_1) + \omega_0 CE \qquad (29)$$

Next, from equation (29), t is computed which complies with the condition of i(t)=0.

$$t|_{i(t)=0} = \omega_0 LC + t_1 = \sqrt{LC} + t_1. \qquad (30)$$

Accordingly, if the transistor Tr2 is rendered non-conductive at time $t=t_1$, the electric energy in the coil 53 is returned to the D.C. power supply 51 for a time of $\sqrt{LC}$.

Figure 5A:
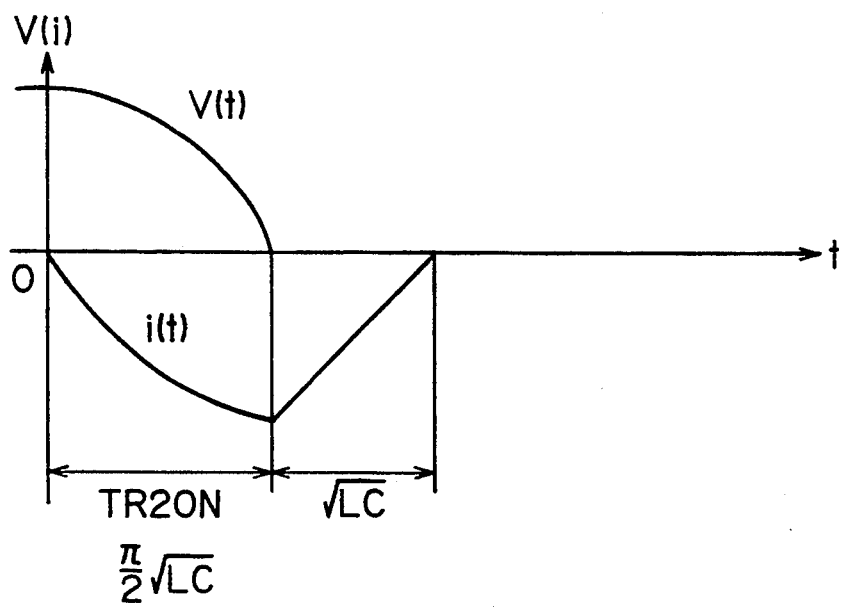
FIG. 5A, 5B, 5C, 5D and 5E are diagrams for illustrating changes of current and voltage.

The voltage v(t) across the piezoelectric elements P and the current i(t) flowing in the coil 53 are as shown in FIG. 5A.

Figure 1:
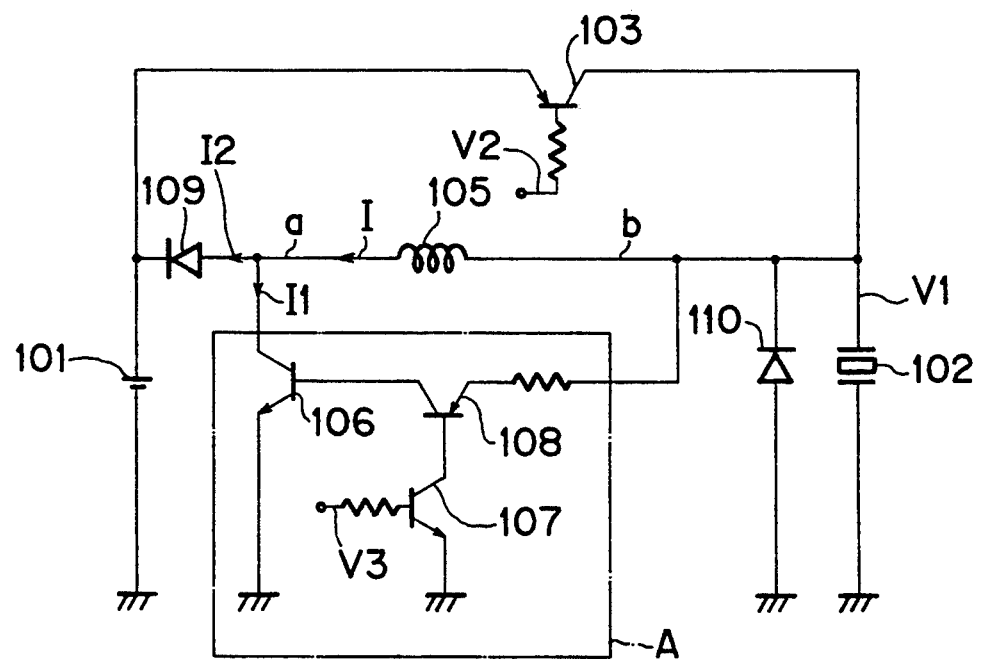
FIG. 1 is a circuit diagram showing a conventional piezoelectric element driving device.

In the above description, if the transistor Tr2 is maintained conductive for a period of time $$\frac{\pi}{2}\sqrt{LC},$$

this operation is equivalent to that of the circuit shown in FIG. 1 wherein after the switching transistor 106 is rendered conductive, the switching transistor 106 is rendered non-conductive when the voltage across the piezoelectric elements P are zeroed. In comparison with the device of the present invention with that of the prior art in FIG. 1, the present invention does not require a voltage detecting means as is required in the prior art. Therefore, the device of the present invention is inexpensive in cost, yet retaining the same capability.

However, according to the present invention, the timing at which the transistor Tr2 is rendered conductive is controlled, so that the time of $$\frac{\pi}{2}\sqrt{LC}$$

will vary for each of the circuit due to the variations in electrostatic capacity C of the piezoelectric elements P and the inductance of the coil 53.

Next, description will be made with respect to the case where the time when the transistor Tr2 is rendered conductive is not equal to $$\frac{\pi}{2}\sqrt{LC}.$$

Description will firstly be made with respect to the case where the transistor Tr2 is conductive for a period of time longer than $$\frac{\pi}{2}\sqrt{LC}.$$

At time of $$t = \frac{\pi}{2}\sqrt{LC},$$

the voltage across the piezoelectric element P is zeroed. Then, the diode D4 is rendered ON, so that the closed loop is formed with the coil 53, switching element Tr2, and the diode D4.

Assuming that the transistor Tr2 and the diode D4 are ideal switching elements, there is no reason that the electrical current energy in the coil 53 is wasted. Hence, the voltage V(t) across the piezoelectric elements P and the current i(t) of the coil 53 are as shown by solid lines in FIG. 5B As a matter of fact, however, the transistor Tr2, the diode D4 and the coil 53 have resistor components. As shown by dotted lines in FIG. 5B, the electrical current energy in the coil 53 are wasted and converted to heat energy during a period of time when the transistor Tr3 is being conductive. Due to the fact that the heat energy as converted is very small in amount and that an amount of heat generated from the driving circuit of the present embodiment is very small, no problem is involved.

Figure 5B:
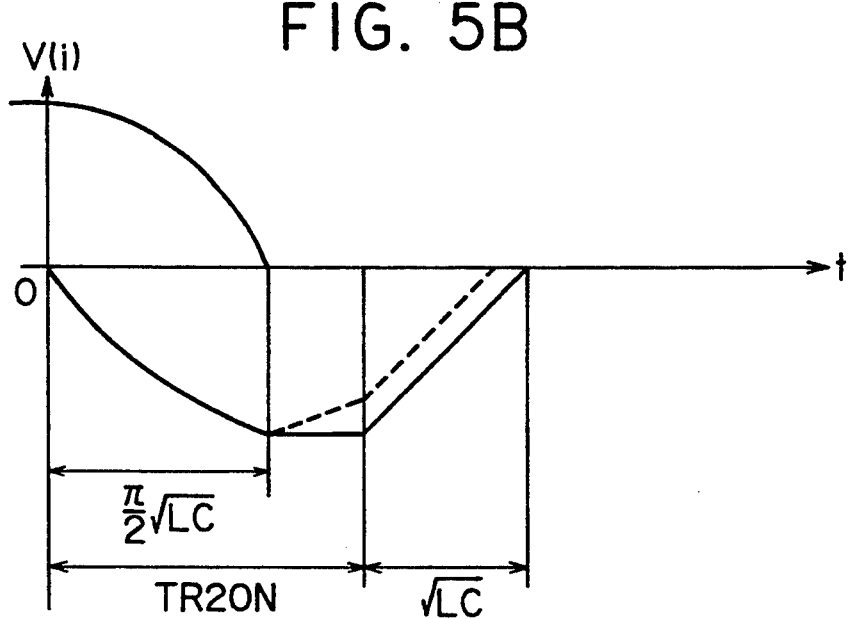

Accordingly, in the case when the transistor Tr2 is being maintained at conductive for a period of time of $$\frac{\pi}{2}\sqrt{LC}$$

or more, the current i(t) in the coil L is zeroed after a time of $\sqrt{LC}$ running from the time when the transistor Tr2 is rendered non-conductive, provided that ideal elements are used as shown by the solid lines in FIGS. 5A and 5B. Accordingly, the transistor Tr2 may again be brought to conductive after the time of $\sqrt{LC}$ from the time when the transistor Tr2 is rendered non-conductive.

Description will next be made with respect to the case where the transistor Tr1 is rendered conductive at a time incoincident with the time when the current flowing in the coil 53 is zeroed due to variation in the electrostatic capacity C of each of the piezoelectric elements P and in the reactance of the coil 53. First of all, description will be made with respect to the case where the transistor Tr2 is rendered conductive before the current i(t) flowing in the coil L is zeroed.

When the transistor Tr2 is rendered conductive, the current flowing in the coil 53 flows in the closed circuit made up of the coil 53, the transistor Tr2 and the diode D4. If the coil 53, the transistor Tr1 and the diode D4 are ideal elements in not having resistor components, the same amount of current flowing in the coil 53 at the time when the transistor Tr2 is rendered conductive will flow during a period of time when the transistor Tr1 is being conductive. However, these elements are normally provided with resistor elements, so that the electrical current energy in the coil 53 is converted to heat energy by the resistor components and the heat is emanated therefrom. However, the transistor Tr1 is being non-conductive for a particular period of time, a particular amount of electrical current energy of the coil 53 is returned to the D. C. current source E, and thus the current i(t) flowing in the coil L is small. Therefore, the amount of heat generated by these elements is small, and hence no problem is encountered.

Description will be made with respect to the case where the transistor Tr2 is rendered conductive after expiration of a prescribed period of time after the current i(t) flowing in the coil 53 is zeroed.

Even if the piezoelectric elements P are urged due to a force of inertia of an enlargement mechanism connected to the piezoelectric elements P, only a low voltage is induced in the piezoelectric elements P. Much lower voltage is induced therein for a short period of time. Therefore, with application of the mechanism to a dot matrix printer, no problem is involved in its displacement. The voltage is discharged through the resistor elements of the coil 53, the transistor Tr2 and the diode D4 when the transistor Tr1 is rendered conductive. Therefore, no problem arises even if the transistor Tr2 is rendered conductive after expiration of a particular period of time after the current i(t) flowing in the coil L is zeroed.

As described above, if the transistor Tr2 is again rendered conductive after expiration of time substantially equal to $\sqrt{LC}$ after the transistor Tr2 is rendered non-conductive, the current flowing in the coil 53 has not yet zeroed. Or no problem arises even if the current has already been zeroed and a time has expired to some extent since then.

Next, description will be made with respect to the case where the transistor Tr2 is rendered conductive for a period of time shorter than $$\frac{\pi}{2} \sqrt{LC}.$$

When the transistor Tr2 is rendered non-conductive at a time $$t = t_1 < \frac{\pi}{2} \sqrt{LC},$$

the current $i(t_1)$ flowing in the coil 53 is given as follows by equation (19).

$$i(t) = i(t)|_{t=t_1} = -\omega_0 CE \sin \omega_0 t_1 \tag{31}$$

On the other hand, when the transistor Tr2 is rendered non-conductive at time $t=t_1$, a current flows in the closed circuit made up of the coil 53, the diode D1, the D.C. power supply 51 and the piezoelectric elements P. With respect to this closed circuit, the following equation is established according to Kirchhoff's second law.

$$E = L \frac{di}{dt}(t - t_1) + \frac{1}{C} \int i(t - t_1) dt \tag{32}$$

The following equation is obtained by introducing q $(t-t_1)$.

$$E = L \frac{d^2}{dt^2} q(t - t_1) + \frac{1}{C} q(t - t_1) \tag{33}$$

By solving the above differential equation, q(t) is obtained. The transient term qt $(t-t_1)$ is a solution of the homogeneous equation (4) with E=0. Accordingly, with equation (12), the following is obtained.

$$q(t-t_1) = A \cos \omega_0 (t-t_1) + B \sin \omega_0 (t-t_1) \tag{34}$$

On the other hand, the steady solution qs is as follows.

$$qs = CE \tag{35}$$

Therefore, from equations (34) and (35), the general solution $q(t-t_1)$ is given as follows.

$$q(t - t_1) = qs + qt(t - t_1) = CE + A\cos\omega_0 t + B\sin\omega_0 t \tag{36}$$

The following equation is obtained by applying equation (3) to equation (36).

$$i(t-t_1) = \omega_0 \{B \cos \omega_0(t-t_1) - A \sin \omega_0(t-t_1)\} \tag{37}$$

With the initial condition of $t=t_1$, the following is obtained.

$$CE \cos \omega_0 t_1 = CE + A \tag{38}$$

$$-\omega_0 CE \sin \omega_0 t_1 = \omega_0 B \tag{39}$$

From equations (38) and (39), the following is obtained.

$$A = CE(\cos \omega_0 t - 1) \tag{40}$$

$$B = CE \sin \omega_0 t_1 \tag{41}$$

Substituting equations (40) and (41) for equations (36) and (37), then the following is obtained.

$$q(t-t_1) = CE + CE(\cos \omega_0 t_1 - 1)\cos \omega_0(t-t_1) - CE \sin \omega_0 t_1 \sin \omega_0(t-t_1) \tag{42}$$

$$i(t-t_1) = -\omega_0 CE \sin \omega_0(t-t_1) - \omega_0 CE(\cos \omega_0 t_1 - b)\sin \omega_0(t-t_1) \tag{43}$$

The following equation is obtained from equations (42) and (20).

$$v(t-t_1) = E + E(\cos \omega_0 t_{11} - 1)\cos \omega_0(t-t_1) - E \sin \omega_0 t_1 \sin \omega_0(t-t_1) \tag{44}$$

Figure 5C:
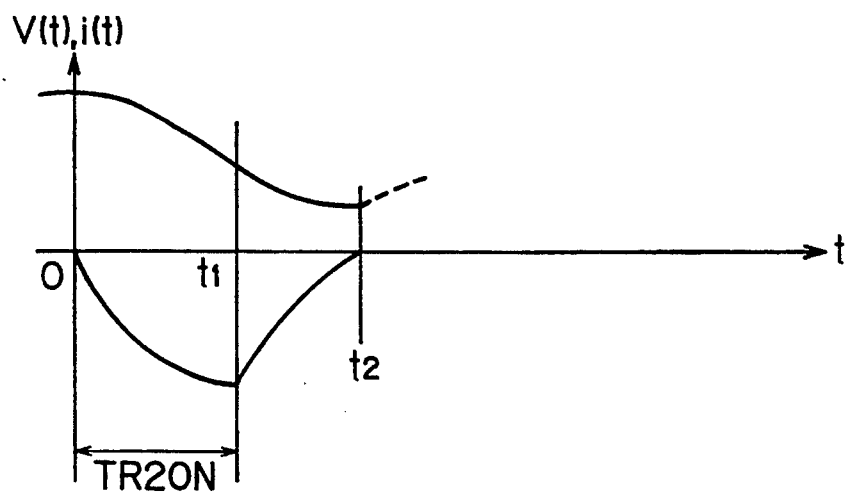

Therefore, the voltage v(t) across the piezoelectric element P and the current i(t) are as shown in FIG. 5C, where at time $t=t_2$ at which time $v(t-t_1)$ is minimum the following equation is established.

$$i(t-t_1)|_{t=t_2} = 0 \tag{45}$$

The left side of equation (45) can be rewritten as follows.

$$i(t - t_1) = -\omega_0 CE\sin\omega_0 t_1 \cos\omega_0(t_2 - t_1) + \tag{46}$$

$$\omega_0 CE(1 - \cos\omega_0 t_1)\sin\omega_0(t = -\omega_0 CE[\tfrac{1}{2}\sin\omega_0\{t_1 + (t_2 - t_1)\} +$$

$$\tfrac{1}{2}\sin\omega_0(t_2 - t_1)] + \omega_0 CE\sin\omega_0(t_2 - t_1) =$$

$$-\omega_0 CE[\tfrac{1}{2}\sin\omega_0\{(t_2 - t_1) + t_1] + \tfrac{1}{2}\sin\omega_0\{(t_2 - t_1) + t_1\} =$$

$$\omega_0 CE\sin\omega_0(t_2 - t_1) - \omega_0 CE\sin\omega_0 t_2 =$$

$$2\omega_0 CE\cos[\tfrac{1}{2}\omega_0\{(t_2 - t_1) + t_2\}]\sin[\tfrac{1}{2}\omega_0\{(t_2 - t_1) - t_2\}] =$$

$$-2\omega_0 CE\cos\omega_0\{t_2 - \tfrac{1}{2}t_1\} \cdot \sin\tfrac{1}{2}\omega_0 t_1$$

Now, the followings equations are met.

$$\omega_0 \neq 0 \tag{47}$$

$$C \neq 0 \tag{48}$$

$$E \neq 0 \tag{49}$$

Accordingly, from equations (45) and (46), the following equation if obtained.

$$\cos \omega_0 \{t_2 - \tfrac{1}{2} t_1\} \cdot \sin \tfrac{1}{2}\omega_0 t_1 = 0 \tag{50}$$

Therefore, either of the following two equations is established.

$$\cos \omega_0 (t_2 - \tfrac{1}{2} t_1) = 0 \tag{51}$$

$$\sin \tfrac{1}{2}\omega_0 t_1 = 0 \tag{52}$$

Sine discussion made here is the case where the transistor Tr3 is being rendered conductive for a period of time shorter than $$\tfrac{\pi}{2} \sqrt{LC} ,$$

the following equation is established.

$$0 < \omega_0 t_1 < \tfrac{\pi}{2} \tag{53}$$

Therefore, equation (52) is not met but equation (51) is met, and thus the following is obtained.

$$\omega_0 \left( t_2 - \tfrac{1}{2} t_1 \right) = \tfrac{\pi}{2} \tag{54}$$

$$t_2 = \tfrac{1}{2}\left( t_1 + \tfrac{\pi}{\omega_0} \right) \tag{55}$$

Figure 5D:
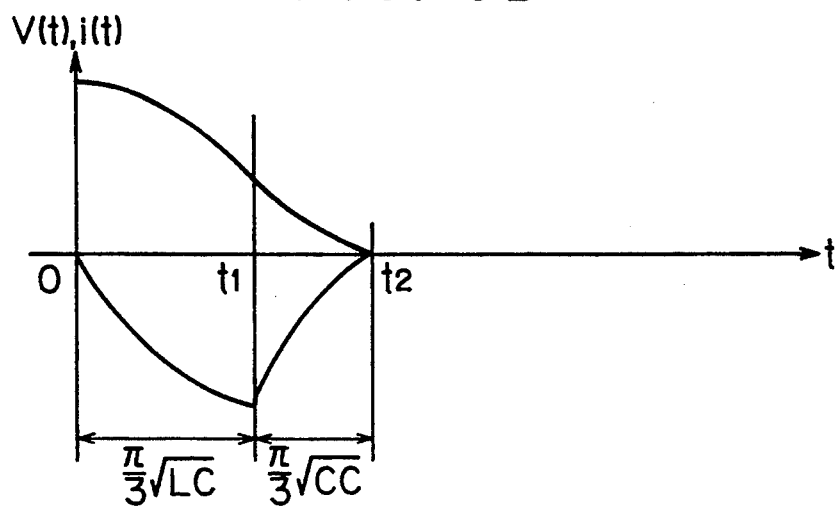

Next, as shown in FIG. 5D, $t_1$ which makes zero the voltage $v(t-t_1)$ across the piezoelectric elements P at time $t=t_1$ is to be obtained. The value of $v(t-t_1)$ at $t=t_2$ is as follows.

$$v(t - t_1)|t = t_2 = E + E(\cos \omega_0 t_1 - 1)\cos\omega_0(t_2 - t_1) - \tag{56}$$

$$E\sin\omega_0 t_2 \cdot \sin(t_2 - t_1) = E + E\cos\omega_0 t_1 \cdot \cos\omega_0(t_2 - t_1) -$$
$$E\cos\omega_0(t_2 - t_1) - E\sin\omega_0 t_2 \cdot \sin\omega_0(t_2 - t_1) = E +$$

$$\tfrac{1}{2} E\cos[\omega_0\{t_1 - (t_2 - t_1)\}] + \tfrac{1}{2} E\cos[\omega_0\{t_1 + (t_2 - t_1)\}] -$$

$$E\cos\omega_0(t_2 - t_1) - \tfrac{1}{2} E\cos[\omega_0\{t_1 - (t_2 - t_1)\}] +$$

$$\tfrac{1}{2} E\cos[\omega_0\{t_1 + (t_2 - t_1)\}] = E + E\cos\omega_0 t_2 -$$

$$E\cos\omega_0(t_2 - t_1) = E - 2E\sin\tfrac{1}{2}\omega_0\{t_2 + (t_2 - t_1)\} \cdot$$

$$\sin\tfrac{1}{2}\omega_0\{t_2 - t_2 - t_1)\} = E - 2E \cdot \sin\omega_0\left( t_2 - \tfrac{1}{2} t_1 \right) \cdot$$

$$\sin\tfrac{1}{2}\omega_0 t_1 = E - 2E \cdot \sin\omega_0\left( \tfrac{1}{2} t_1 + \tfrac{1}{2} \cdot \tfrac{\pi}{\omega_0} - \tfrac{1}{2} t_1 \right) \cdot$$

$$\sin\omega_0 t_1 = E - 2E \cdot \sin\tfrac{\pi}{2} \cdot \sin\omega_0 t_1 = E - 2E\sin\omega_0 t_1$$

Since equation (57) is equal to zero, it can be written as follows.

$$E - 2E \sin \omega_0 t_1 = 0 \tag{57}$$

From equation (49), equation (57) becomes as follows.

$$\sin \omega_0 t_1 = \tfrac{1}{2} \tag{58}$$

From equation (53), the following relation is obtained.

$$t_1 = \tfrac{\pi}{3} \sqrt{LC} \tag{59}$$

Figure 5E:
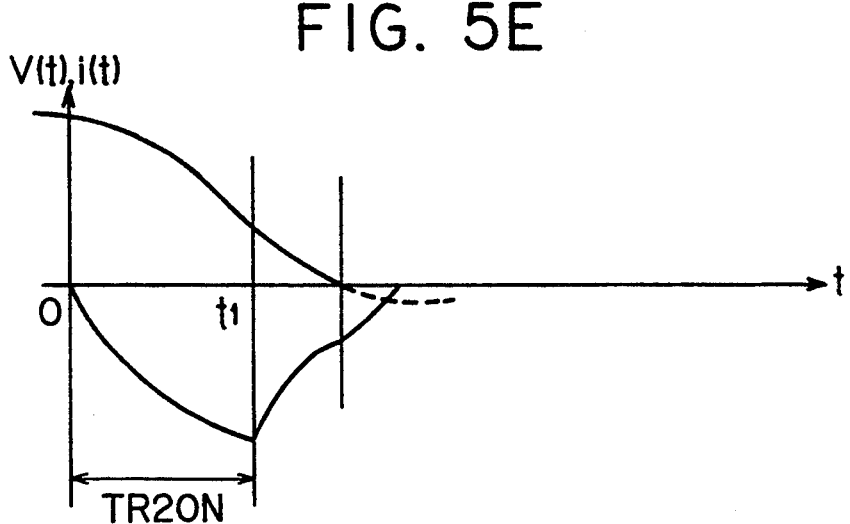

Therefore, if the transistor Tr2 is rendered non-conductive at a time after $$t = \tfrac{\pi}{3} \sqrt{LC} ,$$

the voltage across the piezoelectric element becomes zeroed as shown in FIG. 5E.

Let us consider the value of $t_2$ when the transistor Tr2 is rendered non-conductive at time $$t = \tfrac{\pi}{3} \sqrt{LC} .$$

By substituting equation (59) for equation (55), the following is obtained.

$$t_2|t_1 = \tfrac{\pi}{3} \sqrt{LC} = \tfrac{2\pi}{3} \sqrt{LC} \tag{60}$$

As in FIG. 5A, if the transistor Tr2 is maintained conductive for a period of time of $$\tfrac{\pi}{2} \sqrt{LC} ,$$

a time of $$\left(\tfrac{\pi}{2} + 1\right)\sqrt{LC}$$

is required for the current i(t) of the coil 53 to be zeroed. However, if the transistor Tr2 is maintained conductive for only a period of time of $$\tfrac{\pi}{3} \sqrt{LC}$$

as shown in FIG. 5D, a time of $$\tfrac{2}{3} \pi \sqrt{LC}$$

suffice for the current i(t) of the coil 53 to be zeroed. Since the subsequent driving cannot be performed until the current i(t) of the coil 53 is zeroed, it is efficient to achieve high speed driving of the piezoelectric element if the driving period of time is shorter than $$\frac{\pi}{2}\sqrt{LC}.$$

As described, according to the present invention, it is not necessary to maintain the conduction of the transistor Tr2 for a period of time of $$\frac{\pi}{2}\sqrt{LC}$$

but is suffices to maintain the conduction of the transistor Tr2 at least for a period of time of $$\frac{\pi}{3}\sqrt{LC}.$$

That is, after the switching element Tr2 is rendered non-conductive, the current i(t) flowing in the coil L is zeroed after expiration of the time $$\frac{\pi}{3}\sqrt{LC}.$$

A ratio of the time of to the time of $\sqrt{LC}$ to the time of $$\frac{\pi}{3}\sqrt{LC}$$

is approximately equal to 1:1.047. As mentioned previously, since it is not necessary that this time be exactly equal to $\sqrt{LC}$, the current flowing in the coil L has not yet been zeroed if the switching element Tr2 is again rendered conductive after expiration of the time $\sqrt{LC}$. It is sufficient even if a certain period of time has been elapsed upon the current has been zeroed.

While the present invention has been described with reference to specific embodiments, it would be appreciated for a person skilled in the art that a variety of changes and modifications may be made without departing from the scope and spirit of the invention. For example, to further reduce the consumption power, MOS FETs may be employed in place of the transistors Tr1 through Tr3. Further, in the above-described embodiment, expiration of the waiting time has been measured with the use of a time as performed in steps S7 S9, the processing in step S8 may be executed at a time when the value of the current is zeroed upon detecting the current value as is done in the prior art technique.

As described in detail, according to the present invention, since the electric charges stored in the piezoelectric element are effectively released after the piezoelectric element is deexcited, unwanted electric charges are not stored in the piezoelectric element. Accordingly, low power consumption and low heat generation can be achieved with respect to the piezoelectric actuator employing the driving device for the piezoelectric element.

Further, the present invention does not require means for detecting a current, the circuit configuration can be greatly simplified. In addition, as to the time used in the present invention, the one incorporated in a control circuit of a printer can be commonly used. As such, the number of components for configuring the circuit can be reduced and thus the cost of manufacturing the device can be reduced.

What is claimed is:

1. A driving device for driving a piezoelectric element having first and second terminals, comprising:
   power supplying means:
   a coil having a first terminal electrically connected to the first terminal of said piezoelectric element, and a second terminal;
   first switching means interposed between said power supplying means and the second terminal of said coil and selectively rendered ON and OFF to selectively supply electrical energy from said power supplying means to said coil;
   second switching means selectively rendered ON and OFF, said second switching means electrically connecting the second terminal of said coil to the second terminal of said piezoelectric element when said second switching means is ON, thereby forming a resonance circuit with said piezoelectric element and said coil;
   connecting means for allowing the electrical energy to return from the second terminal of said coil to said power supplying means; and
   control means for controlling said first and second switching means, wherein said control means controls said first switching means to render ON to instruct displacement of said piezoelectric element and further controls said first switching means to render OFF and said second switching means to render ON to instruct restoration of said piezoelectric element from a displaced condition, and wherein said control means controls said second switching means to render OFF after expiration of a predetermined period of time from a time when said second switching means is rendered ON to allow the electrical energy retained in said piezoelectric element to appear in said coil and feed back the electrical energy to said power supplying means through said connecting means, wherein said predetermined period of time is defined by $\pi/3 \, (LC)^{\frac{1}{2}}$ where L is an inductance of said coil and C is an electrostatic capacitance of said piezoelectric element.

2. The driving device according to claim 1, wherein said control means includes time measuring means for measuring the predetermined period of time and wherein said control means controls said second switching means to render ON when said time measuring means indicates expiration of the predetermined period of time.

3. The driving device according to claim 2, wherein the predetermined period of time is determined based on an inductance of said coil and a capacitance of said piezoelectric element.

4. The driving device according to claim 1, wherein said control means waits another predetermined period of time from a time when said first switching means is rendered ON until said first switching means is thereafter rendered OFF so that a sufficient amount of charges are accumulated in said piezoelectric element.

5. The driving device according to claim 4, further comprising a first closed loop including said coil and said first switching means for allowing a current to continuously flow in said coil until said first switching means rendered OFF.

6. The driving device according to claim 5, further comprising third switching means having a first terminal connected to said power supplying means, a second terminal connected to the first terminal of said piezoelectric element and a third terminal connected to said control means, and a second closed loop including said coil and said power supplying means, wherein said control means controls said third switching means to render ON when said first switching means is rendered OFF, and wherein a current is supplied to said piezoelectric element through said third switching means if charges retained in said piezoelectric element are wasted and a current flowing in said coil is allowed to flow in said second closed loop.

7. The driving device according to claim 6, wherein said control means controls said third switching means to render OFF after expiration of yet another predetermined period of time from a time when said third switching means is rendered ON.

8. The driving device according to claim 6, wherein said control means controls said second switching means to render ON after said third switching means is rendered ON so that a current resulting from the charges accumulated in said piezoelectric element is flowed in a closed loop consisting of said coil and said second switching means, whereby loss of electrical energy is not caused.

9. A driving device for driving a piezoelectric element having first and second terminals, comprising:
power supplying means:
a coil having a first terminal electrically connected to the first terminal of said piezoelectric element, and a second terminal electrically connected to said power supplying means;
first switching means interposed between said power supplying means and the second terminal of said coil for selectively connecting said power supply means to and disconnecting said power supply means from said coil;
second switching means selectively rendered ON and OFF, said second switching means electrically connecting the second terminal of said coil to the second terminal of said piezoelectric element when said second switching means is ON, thereby forming a resonance circuit when said piezoelectric element and said coil;
connecting means for connecting the second terminal of said coil to said power supplying means to allow a current to flow from the second terminal of said coil to said power supplying means; and
control means for controlling said first and second switching means, wherein said control means controls said first switching means to render ON to instruct displacement of said piezoelectric element and further controls said first switching means to render OFF and said second switching means to render ON to instruct restoration of said piezoelectric element from a displaced condition, and wherein said control means controls said second switching means to render OFF after expiration of a predetermined period of time from a time when said second switching means is rendered ON to allow electrical energy retained in said piezoelectric element to appear in said coil and feed back the electrical energy to said power supplying means through said connecting means and further controls said second switching means to again render ON after said second switching means is rendered OFF to release electric charges in said piezoelectric element produced when a stress is imparted to said piezoelectric element at the time of restoration, said control means includes time measuring means for measuring the predetermined period of time based on an inductance of said coil and a capacitance of said piezoelectric element and said control means controls said second switching means to render ON when said time measuring means indicates expiration of the predetermined period of time.

10. The driving device according to claim 9, wherein said control means waits another predetermined period of time from a time when said first switching means is rendered ON until said first switching means is thereafter rendered OFF so that a sufficient amount of charges are accumulated in said piezoelectric element.

11. The driving device according to claim 10, further comprising a first closed loop including said coil and said first switching means for allowing a current to continuously flow in said coil until said first switching means rendered OFF.

12. The driving device according to claim 11, further comprising third switching means having a first terminal connected to said power supplying means, a second terminal connected to the first terminal of said piezoeletric element and a third terminal connected to said control means, and a second closed loop including said coil and said power supplying means, wherein said control means controls said third switching means to render ON when said first switching means is rendered OFF, and wherein a current is supplied to said piezoelectric element through said third switching means if charges retained in said piezoelectric element are wasted and a current flowing in said coil is allowed to flow in said second closed loop.

13. The driving device according to claim 12, wherein said control means controls said third switching means to render OFF after expiration of yet another predetermined period of time from a time when said third switching means is rendered ON.

14. The driving device according to claim 13, wherein said control means controls said second switching means to render ON after said third switching means is rendered ON so that a current resulting from the charges accumulated in said piezoelectric element is flowed in a closed loop consisting of said coil and said second switching means, whereby loss of electrical energy is not caused.

* * * * *